(12) United States Patent
Darredeau

(10) Patent No.: US 6,294,053 B1
(45) Date of Patent: Sep. 25, 2001

(54) LIQUID DISPENSER FOR OSCILLATING DISTILLING COLUMN, AND CORRESPONDING DISTILLING COLUMN

(75) Inventor: Bernard Darredeau, Sartrouville (FR)

(73) Assignee: L'Air Liquide, Societe, Anonyme pour l'Etude et l'Exploitation des Procedes Georges Claude, Paris Cedex (FR)

( * ) Notice: Subject to any disclaimer, the term of this patent is extended or adjusted under 35 U.S.C. 154(b) by 0 days.

(21) Appl. No.: 09/554,410
(22) PCT Filed: Nov. 9, 1998
(86) PCT No.: PCT/FR98/02388
  § 371 Date: Mar. 12, 2000
  § 102(e) Date: Mar. 12, 2000
(87) PCT Pub. No.: WO99/25446
  PCT Pub. Date: May 27, 1999

(30) Foreign Application Priority Data

Nov. 17, 1997 (FR) .................................................. 97 14379

(51) Int. Cl.$^7$ ............................... B01D 3/00; B01D 3/32; F25V 3/04
(52) U.S. Cl. ............................ 202/158; 62/643; 159/43.1; 202/204; 202/262; 261/19; 261/97; 261/110
(58) Field of Search ...................................... 202/158, 204, 202/83, 175, 262; 196/133; 62/643; 159/43.1; 261/19, 97, 110

(56) References Cited

U.S. PATENT DOCUMENTS

| | | | |
|---|---|---|---|
| 3,929,421 | * 12/1975 | Werges | 422/193 |
| 4,776,989 | 10/1988 | Harper et al. | 261/97 |
| 4,816,191 | * 3/1989 | Berven et al. | 261/97 |
| 5,051,214 | * 9/1991 | Chen et al. | 261/97 |
| 6,149,136 | * 11/2000 | Armstrong et al. | 261/110 |

FOREIGN PATENT DOCUMENTS

| | | | |
|---|---|---|---|
| 1 113 680 | 9/1961 | (DE). | |
| 0264581 | * 4/1988 | (EP) | 202/158 |
| 1485495 | * 9/1977 | (GB). | |
| 2 039 779 | 8/1980 | (GB). | |
| 2 062 489 | 5/1981 | (GB). | |

* cited by examiner

Primary Examiner—Virginia Manoharan
(74) Attorney, Agent, or Firm—Young & Thompson

(57) ABSTRACT

This liquid distributor includes:
  a primary distributor (13) including liquid-distribution openings and delimiting N1 first compartments (22), each provided with liquid feed elements means (10, 11); and
  a secondary distributor (14), arranged under the primary distributor (13) and including a dish with openworked perforated bottom which occupies substantially the entire cross-section of the distillation column (2), this dish being subdivided by partitions (25) into N2 second compartments (24), with N2>N1.

12 Claims, 1 Drawing Sheet

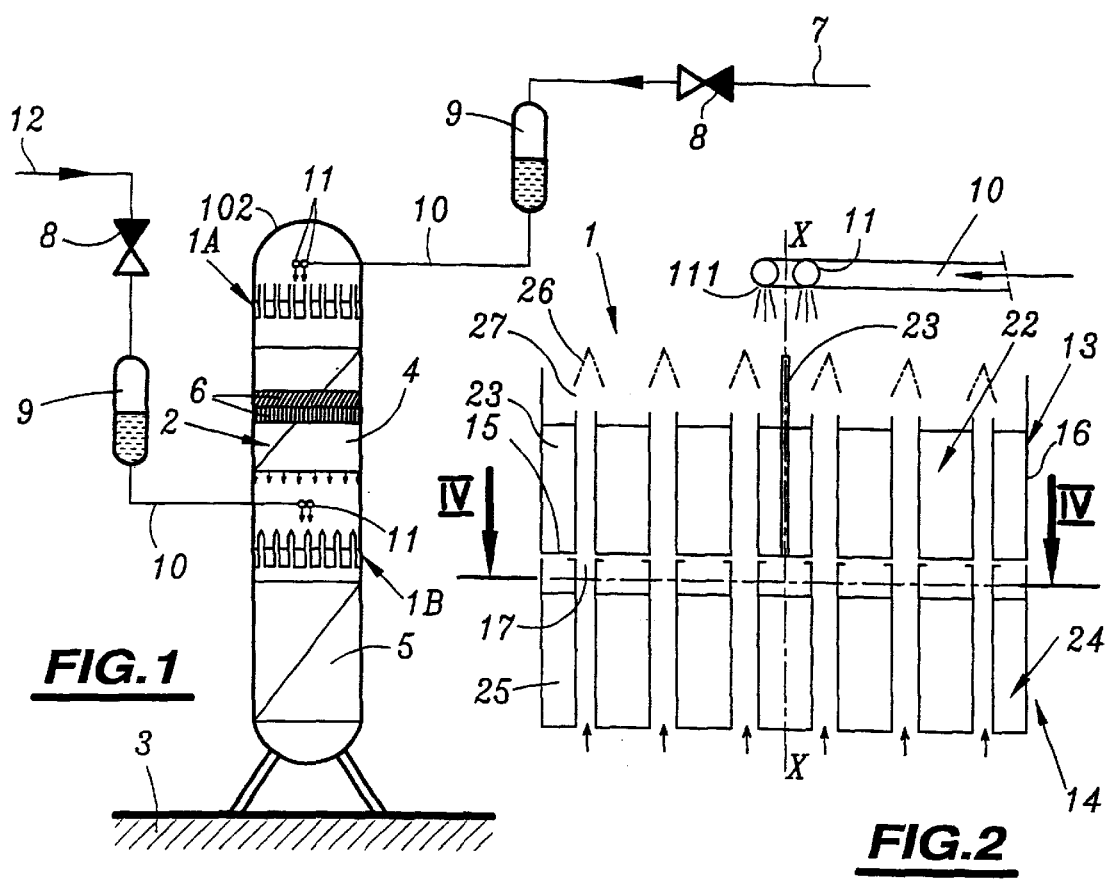
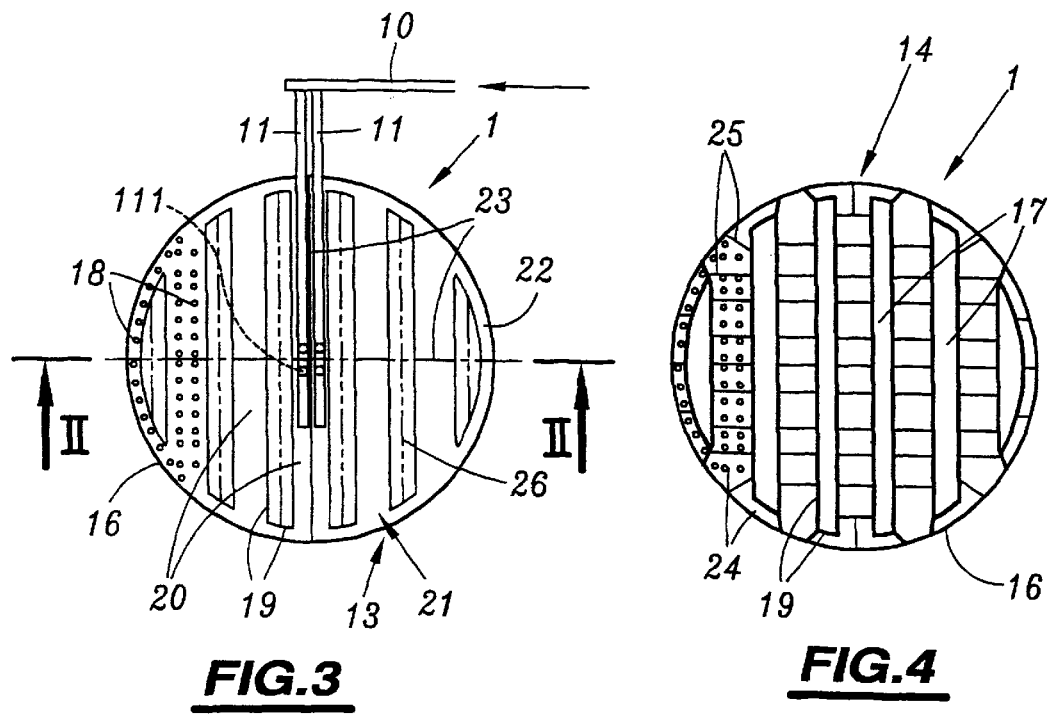

LIQUID DISPENSER FOR OSCILLATING DISTILLING COLUMN, AND CORRESPONDING DISTILLING COLUMN

FIELD OF THE INVENTION

The present invention relates to a liquid distributor for oscillating distillation column. It applies in particular to the air distillation columns on board floating structures such as offshore oil platforms or barges.

BACKGROUND OF THE INVENTION

Offshore oil platforms produce residual gases. For economic and environmental reasons, it is becoming more and more necessary to recover these gases. One method consists in converting them into heavier hydrocarbons, which are in liquid form and are therefore easier to transport, using the Fischer-Tropsch process which consumes large amounts of oxygen.

It would therefore be beneficial to be able to install an air distillation column on board a platform or a barge, but proper operation of equipment of this type is compromised by serious difficulties. Specifically, a first imperative is for the liquid to be distributed uniformly at the column head over the entire cross-section of the latter, despite the oscillations of its axis due to the motion of the waves.

SUMMARY OF THE INVENTION

The object of the invention is to provide a liquid distributor whose operation has very little sensitivity to oscillations of this type.

To that end, the invention relates to a liquid distributor for oscillating distillation column, characterized in that it comprises:

a primary distributor including liquid-distribution openings and delimiting N1 first compartments, with N1 ≧2;

means for the balanced feeding of liquid to each of the first compartments; and a secondary distributor, arranged under the primary distributor and comprising a dish with openworked perforated bottom which occupies substantially the entire cross-section of the distillation column, this dish being subdivided by partitions into N2 second compartments, with N2 >N1;

the ratio of the area of each second compartment to the sum of the cross-sections of the openings of the primary distributor which feed it being substantially constant from one second compartment to another.

The distributor according to the invention may have one or more of the following characteristics:

all the second compartments have substantially the same area and the same perforation factor;

the number N1 is less than 5 and the number N2 is of the order of several tens;

the primary distributor comprises a primary dish whose perforated bottom has the same configuration as that of the secondary dish and is superposed with the latter;

the said feed means comprise a phase separator and a feed conduit connected upstream to the lower part of this separator and downstream to tubes which are perforated plumb with each of the first compartments, the ratio of the area of a first compartment to the sum of the cross-sections of the corresponding perforations of the tubes being constant from one first compartment to another;

the tubes are tapped at points adjacent to the feed conduit and have orifices adjacent to the central axis of the distributor;

the said feed means comprise a phase separator and perforated tubes which are connected to adjacent points of the lower part of the separator.

The invention also relates to a distillation column comprising a distributor as defined above.

In one embodiment of such a distillation column, the said liquid distributor is arranged at a first level of the column, in particular at the column head, and the column includes, at at least one second level, a second liquid distributor as defined above.

BRIEF DESCRIPTION OF THE DRAWINGS

An embodiment of the invention will now be described with reference to the appended drawing, in which:

FIG. 1 schematically represents an oscillating distillation column which is equipped with two liquid distributors according to the invention and is on board a floating structure;

FIG. 2 schematically represents, on a larger scale and in section on the line I—I in FIG. 3, the head distributor of the distillation column in FIG. 1;

FIG. 3 is a plan view of this distributor; and

FIG. 4 is a view taken in section on the line IV—IV in FIG. 2.

DETAILED DESCRIPTION

The distributor 1 represented in FIGS. 2 to 4 is intended to be mounted at the head of an air distillation column 2 which is schematized in FIG. 1 as being the low-pressure column of a double air distillation column.

The column 2 is fixed on a floating structure 3, schematized in FIG. 1, as is the medium-pressure column of the double distillation column (not shown). FIG. 1 only shows the elements which help in understanding the present invention, although the double column obviously has all the elements which are conventional in the art.

More particularly, the column 2 is subdivided into an upper distillation section 4 and a lower distillation section 5, both consisting of cross-corrugated packing. As is well known, this type of packing includes superposed cross-corrugated packing sections or packs 6, each of which is in the form of a cylindrical slab occupying the entire cross-section of the, column.

Each pack 6 consists of a stack of corrugated strips with oblique corrugations. Each strip has a vertical general plane, all the strips have the same height, and the corrugations are alternatively inclined in one direction and in the other from one strip to the next. The corrugations of adjacent strips thus touch at a large number of intersection points. Furthermore, the packs 6 are offset angularly by 90° from one pack to the next relative to the general axis of the column. Above the upper section 4, the column contains a distributor 1 as described below, which is the head distributor 1A of the column. A similar second distributor, which constitutes an intermediate distributor 1B, is arranged below the section 4 and above the distillation section 5.

In service, "lean liquid" (almost pure nitrogen drawn from the head of the medium-pressure column) which arrives via a feed conduit 7 and is relieved to the pressure of the column 2 in a pressure-reduction valve 8, is introduced into a phase separator 9. The liquid collected in the latter is introduced, via a feed manifold 10 connected to the lower part of the separator, into two parallel tubes 11 each of which has two lower orifices 111. These two tubes are arranged in the upper dome 102 of the column and form the liquid feed means of the distributor 1A. The distributor 1A distributes this liquid over the entire cross-section of the upper pack 6 of the distillation section 4, in a manner which will be described below.

The oxygen-enriched liquid delivered by this section 4 falls, throughout the lower surface of this section, onto the intermediate distributor 1B. Furthermore, "rich liquid" with the same composition (oxygen-enriched air collected from the base of the medium-pressure column), which is obtained from the medium-pressure column via a conduit 12, is added to this liquid by means of an assembly formed by a pressure-reduction valve 8, a phase separator 9, a manifold 10 and tubes 11, which is identical to the one described above. The liquid is redistributed in full by the distributor 1B over the entire cross-section of the column, to form the reflux of the lower distillation section 5.

The structure of the distributors 1A and 1B will now be described with reference to FIGS. 2 to 4.

The distributor 1A consists of two parts, namely a primary distributor 13 and a secondary distributor 14 which is arranged underneath, and aforementioned feed means 9 to 11.

The primary distributor 13 has a dish which is open at the top, has a horizontal bottom 15 and a cylindrical peripheral wall 16 which rises from this bottom. The bottom 15 has six slots 17 with a shape elongated in the direction parallel to the tubes 11, which leave free, on the other hand, five strips parallel to the said direction. This ring and these strips are perforated by a large number N of holes 18, which have a diameter sufficient to prevent any risk of obstruction by impurities contained in the liquid to be distributed. The number N is typically of the order of 1000 to 3000 for a column with a diameter of 4 m.

Each slot 17 is surrounded in full by a vertically rising wall 19 which, with the peripheral wall 16, delimits five straight funnels 20 plumb with the aforementioned strips and a peripheral annular funnel 21 which communicates with all the funnels 20.

Furthermore, the dish is subdivided into four compartments 22 of equal area by two mutually perpendicular vertical partitions 23 which intersect on the central axis X—X of the dish, which coincides with the central axis of the column 2. One of the partitions 23 passes through the middle plane of the central funnel 20.

The tubes 11 are adjacent to one another and are arranged plumb with the third funnel 20, on either side of the partition 23 which divides it, with one orifice 111 each opening into each of the corresponding compartments 22, in immediate proximity to the intersection of the partitions 23. As a variant, there could be a plurality of orifices per compartment, and optionally more than two tubes 11, the essential feature being, on the one hand, that the sum of the cross-sections of the orifices which open into each compartment is the same, and on the other hand that all the orifices are close to one another so that they remain at similar levels when the column is inclined.

The secondary distributor 14 is identical to the primary distributor 13 apart from two differences.

On the one hand, the partitions 23 are absent. On the other hand, the funnels 20 and 21 are subdivided into many more than four secondary compartments 24 by a set of vertical partitions 25 which extend between the walls 19 and between the latter and the peripheral wall 16. The number of compartments 24, and the way in which they are arranged, will be chosen so that they all have the same area and the same perforation factor, as well as a maximum dimension at most equal to about 300 mm.

The primary 13 and secondary 14 distributors are directly superposed, that is to say each wall 16 or 19 of one of them lies in the vertical extension of the corresponding wall of the other. The upper edges of at least some of the walls of the secondary distributor are fixed to the bottom 15 of the primary distributor, so as to form a monobloc assembly.

The distributor 1B is identical to the distributor 1A, apart from the fact that, in the primary distributor 13, the pairs of parallel walls 19 which surround the adjacent funnels 20 are connected at their upper end by double-sloping roofs 26 and have a horizontal row of openings 27 just below these roofs, as indicated by dot/dash lines in FIG. 2.

In service, the liquid descending in the column 2 is in exchange contact as regards matter and heat with the oxygen gas obtained by heating liquid oxygen, collected from the base of the column 2, through nitrogen gas from the head of the medium-pressure column. This gas becomes progressively enriched with nitrogen as it rises in the column 2.

The gas flows have not been represented in FIG. 1 for the sake of clarity. However, it will be understood that the rising gas passes without difficulty through the distributors 1A and 1B via the slots 17 and the openings 27, as schematized by arrows in FIG. 2.

When the structure 3 is at sea, the axis of the column 2 oscillates about its normally vertical position. The terms horizontal and "vertical" used above to describe the distributor 1 should be understood as referring to this central position of the column, but when the latter is inclined, the bundle of tubes 11, the bottoms 15, the walls 16 and 19 and the partitions 23 and 25 become inclined by the same angle.

By virtue of the partitioning of the secondary distributor into multiple compartments 24 of smaller size, the difference in level between the holes 18 of each compartment 24 remains very small for all positions of the axis X—X, the maximum inclination of which is typically between 5 and 10°. Consequently, the depth of liquid above them varies little from one hole to the other. It will further be noted that, at any time, the strongly fed holes are close to weakly fed holes of an adjacent compartment, so that these two flow rates are readily compensated in the same region of the upper pack 6 of the distillation section lying immediately below.

The influence of the inclination on the uniformity with which the liquid is distributed is further reduced, on the one hand, through the balanced feeding of the compartments 24 by the four primary compartments 22, the areas of which are four times less than that of the column 2, and on the other hand by the fact that, since the inclination varies periodically with a relatively short period typically of the order of 20 s, the average level in each compartment 24 does not have time to vary significantly.

Furthermore, the proximity of the tubes 11 and of the orifices 111 ensures balanced feeding of the compartments 22 in spite of the inclination of the axis X—X. This result could also be obtained, as a variant, by means of four tubes which start from four adjacent points on the bottom of the separator 9 and each have an orifice 111 which opens plumb with a respective compartment 22.

In total, distribution of the liquid with satisfactory uniformity is obtained over the entire cross-section of the column.

If desired, each compartment 22 may be equipped with means for remixing the liquid, for example inclined partitions descending from the wall 16, as is known per se.

WO-A-90/10 497 describes, amongst others, packing which is similar to the aforementioned cross-corrugated packing but is perforated in a different way. The term "cross-corrugated packing" used here also comprises such packing, as well as any similar packing.

What is claimed is:

1. Liquid distributor for oscillating distillation column, comprising:

a primary distributor including liquid-distribution openings and delimiting N1 first compartments, with $N1 \geq 2$;

means for the balanced feeding of liquid to each of the first compartments; and a secondary distributor, arranged under the primary distributor and comprising a dish with openworked perforated bottom which occupies substantially the entire cross-section of the distillation column, said dish being subdivided by partitions into N2 second compartments, with $N2 > N1$;

the ratio of the area of each second compartment to the sum of the cross-sections of the openings of the primary distributor which feed it being substantially constant from one second compartment to another.

2. Distributor according to claim 1, wherein the second compartments have substantially the same area and the same perforation factor.

3. Distributor according to claim 1, wherein the number N1 is less than 10 and the number N2 is of the order of several tens.

4. Distributor according to claim 1, wherein the primary distributor comprises a primary dish whose perforated bottom has the same configuration as that of the secondary dish and is superposed with the latter.

5. Distributor according to claim 1, wherein said feed means comprise a phase separator and a feed conduit connected upstream to the lower part of this separator and downstream to tubes which are perforated plumb with each of the first compartments, the ratio of the area of a first compartment to the sum of the cross-sections of the corresponding perforations of the tubes being constant from one first compartment to another.

6. Distributor according to claim 5, wherein the tubes are tapped at points adjacent to the feed conduit and have orifices adjacent to the central axis of the distributor.

7. Distributor according to claim 1, wherein said feed means comprise a phase separator and perforated tubes which are connected to adjacent points of the lower part of the separator.

8. Distillation column comprising a liquid distributor which comprises:

a primary distributor including liquid-distribution openings and delimiting N1 first compartments, with $N1 \geq 2$;

means for the balanced feeding of liquid to each of the first compartments; and a secondary distributor, arranged under the primary distributor and comprising a dish with openworked perforated bottom which occupies substantially the entire cross-section of the distillation column, said dish being subdivided by partitions into N2 second compartments, with $N2 > NM$;

the ratio of the area of each second compartment to the sum of the cross-sections of the openings of the primary distributor which feed it being substantially constant from one second compartment to another.

9. Distillation column according to claim 8, wherein said liquid distributor is arranged at a first level of the column, and the column includes, at least one second level, an additional liquid distributor which comprises:

an additional primary distributor including liquid-distribution openings and delimiting N1 additional first compartments, with $N1 \geq 2$;

means for the balanced feeding of liquid to each of the additional first compartments; and an additional secondary distributor, arranged under the additional primary distributor and comprising an additional dish with openworked perforated bottom which occupies substantially the entire cross-section of the distillation column, said additional dish being subdivided by partitions into N2 additional second compartments, with $N2 > N1$;

the ratio of the area of each additional second compartment to the sum of the cross-sections of the openings of the additional primary distributor which feed it being substantially constant from one additional second compartment to another.

10. Distillation column according to claim 9, wherein said additional primary distributor occupies substantially the entire cross-section of the column and is directly fed with a liquid output of a distillation section located above said additional distributor.

11. Distillation column according to claim 8, wherein said column is on board a floating structure.

12. Distillation column according to claim 11, wherein said floating structure is an offshore oil platform or a barge.

* * * * *